United States Patent
Vempati et al.

(10) Patent No.: US 7,941,171 B2
(45) Date of Patent: May 10, 2011

(54) ACTIVATING A PUSH-TO-TALK GROUP FEATURE USING AN UNSTRUCTURED SUPPLEMENTARY SERVICE DATA MESSAGE

(75) Inventors: Brahmananda Vempati, Dallas, TX (US); Jianming Xu, Plano, TX (US); Ghassan Naim, Garland, TX (US); Seshagiri Rao Madhavapeddy, Richardson, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1179 days.

(21) Appl. No.: 11/568,069

(22) PCT Filed: Apr. 21, 2005

(86) PCT No.: PCT/US2005/013794
§ 371 (c)(1),
(2), (4) Date: Oct. 19, 2006

(87) PCT Pub. No.: WO2005/107095
PCT Pub. Date: Oct. 11, 2005

(65) Prior Publication Data
US 2008/0096597 A1  Apr. 24, 2008

Related U.S. Application Data

(60) Provisional application No. 60/564,056, filed on Apr. 21, 2004.

(51) Int. Cl.
*H04W 4/10* (2009.01)
*H04W 4/14* (2009.01)

(52) U.S. Cl. .................. 455/519; 455/416; 455/466

(58) Field of Classification Search .................. None
See application file for complete search history.

(56) References Cited

U.S. PATENT DOCUMENTS

| | | | |
|---|---|---|---|
| 6,081,711 A | 6/2000 | Geulen | |
| 6,477,366 B1 * | 11/2002 | Valentine et al. | 455/518 X |
| 2003/0148779 A1 * | 8/2003 | Aravamudan et al. | 455/519 |
| 2003/0153340 A1 | 8/2003 | Crockett et al. | |
| 2004/0009761 A1 | 1/2004 | Money et al. | |
| 2004/0057449 A1 | 3/2004 | Black | |
| 2004/0151158 A1 | 8/2004 | Gannage et al. | |
| 2004/0249949 A1 | 12/2004 | Gourraud et al. | |
| 2004/0259580 A1 | 12/2004 | Florkey | |
| 2005/0143135 A1 | 6/2005 | Brems et al. | |

FOREIGN PATENT DOCUMENTS

| | | |
|---|---|---|
| WO | 03003653 A | 1/2003 |
| WO | 03039173 A | 5/2003 |
| WO | 03101007 A | 12/2003 |

OTHER PUBLICATIONS

EP Supplemental Search Report published Jun. 11, 2008.

* cited by examiner

*Primary Examiner* — Philip J Sobutka
(74) *Attorney, Agent, or Firm* — Garlick Harrison & Markison; Holly L. Rudnick

(57) ABSTRACT

Techniques for implementing a push-to-talk feature in a mobile telecommunications environment (100) involve receiving an indication to activate a push-to-talk service for a first mobile device (130(2)) and identifying a group of mobile devices (130) associated with the push to-talk service for the first mobile device in response to the indication. The indication is received in an unstructured supplementary service data message. A notification relating to the indication to activate the push-to-talk service for the first mobile device is sent to one or more mobile devices from the identified group of mobile devices.

21 Claims, 10 Drawing Sheets

ACTIVATING A PUSH-TO-TALK GROUP FEATURE USING AN UNSTRUCTURED SUPPLEMENTARY SERVICE DATA MESSAGE

REFERENCE TO RELATED APPLICATIONS

This application is related to and claims the benefit of co-pending provisional application Ser. No. 60/564,056, filed Apr. 21, 2004, which is incorporated herein by reference.

TECHNICAL FIELD

This description relates to voice and data communications and, more particularly, to implementing push-to-talk capabilities in a wireless telecommunications network.

BACKGROUND

A wireless network is generally composed of two sub-networks: a Radio Access Network (RAN), which handles radio related issues such as managing and assigning radio resources to a mobile station, and a Core Network (CN), which performs routing of calls and links a mobile user to other mobile users and to the wireline network. Wireless networks typically support voice calls and other related services, such as caller ID and text messaging. Due to wireless coverage limitations in each RAN, a mobile station moving outside the boundaries of a RAN during a call must switch its service over to a neighboring RAN to avoid service disconnection. Conventionally, such handoffs are directed by a mobile switching center (MSC), which performs switching functions, controls a number of RANs, and coordinates handoffs between neighboring RANs and with RANs controlled by neighboring MSCs.

Another service that is supported by some wireless networks is a push-to-talk feature, which enables mobile stations to operate in a similar manner to what is commonly referred to as "walky-talky." In particular, by pushing a button on the mobile station, a user can transmit voice signals that can be received by other push-to-talk service users. Instead of communicating over a direct radio link between different mobile stations, as in a walky-talky scenario, a push-to-talk service uses the wireless network for transmitting voice signals. The wireless network enables push-to-talk communications across a much wider and potentially unlimited geographical area. In addition, push-to-talk communications are not broadcast on an unsecured channel but are transmitted only to one or more selected mobile stations. Accordingly, a push-to-talk service can be used to enable voice connections to be established between two or more mobile stations without establishing a conventional call connection (e.g., using a dial tone, dialing, ringing, and answer sequence) and without maintaining a continuous two-way communication channel.

SUMMARY

The following description describes implementations for providing a push-to-talk (PTT) service that may permit users to establish a walky-talky service over cellular handsets. During a push-to-talk session, users may be given "talk" control (e.g., by pressing and holding a "talk" button on a mobile handset), and may release talk control (e.g., by releasing the talk button to give "talk" control to another party in the group).

In one general aspect, a push-to-talk feature in a mobile telecommunications environment can facilitate receiving an indication to activate a push-to-talk service for a first mobile device and identifying a group of mobile devices associated with the push-to-talk service for the first mobile device in response to the indication. The indication is received in an unstructured supplementary service data message. A notification relating to the indication to activate the push-to-talk service for the first mobile device is sent to one or more mobile devices from the identified group of mobile devices.

Implementations can include one or more of the following features. A call setup request is received from the first mobile device, and a conference bridge that includes two or more mobile devices from the group of mobile devices is established in response to the call setup request. A signal is received from a mobile device connected to the conference bridge, and a connection status of the mobile device is changed in response to the signal without changing a voice connection status of other mobile devices on the conference bridge. The signal is a dual tone multi-frequency signal, and the connection status is a zero-way connection, a one-way connection, or a two-way connection. The push-to-talk service is an update to an identification of a mobile device in the group of mobile devices. The push-to-talk service is activated in response to the indication, and an indication of a status of the push-to-talk service is stored. A short message service message is used to send the notification to the one or more mobile devices.

A mobile switching center activates the push-to-talk service in response to the unstructured supplementary service data message, and a push-to-talk server stores data relating to the activated push-to-talk service. The data includes identification information for mobile devices included in the push-to-talk group, and the mobile switching center establishes, in response to a call setup message, a conference bridge for mobile devices in the push-to-talk group using identification information received from the push-to-talk server. The mobile switching center is a distributed switching center that includes a call server and media gateways. The media gateways handle bearer traffic and the call server controls the media gateways and communicates with the push-to-talk server. At least one media gateway establishes the conference bridge under control of the call server. The mobile switching center establishes a context for each of the mobile devices, and the conference bridge connects the contexts.

The push-to-talk server deactivates the push-to-talk service after a predetermined period unless a message is received from the first mobile device and initiates a short message service message to another mobile device to provide a notification of the deactivated push-to-talk service. The push-to-talk server updates the identification information in response to an unstructured supplementary service data message from the first mobile device or a message received in a transfer protocol session. The mobile switching center initiates a short message service message to a mobile device to provide a notification of the updated identification information. The mobile switching center initiates a short message service (SMS) message to a mobile device using the identification information. The SMS message includes a notification of the activated push-to-talk service. A home location register receives the unstructured supplementary service data message from the first mobile device and sends a message to the mobile switching center requesting activation of the push-to-talk service. The mobile switching center changes a connection status for one of the mobile devices in the push-to-talk group in response to a dual tone multi-frequency signal.

In another general aspect, a push-to-talk feature in a mobile telecommunications environment is facilitated by receiving a call setup request from a first mobile device and identifying the call setup request as a request for a push-to-talk service. A group of mobile devices associated with the push-to-talk service is identified. A conference bridge that includes two or more mobile devices from the group of mobile devices is established in response to the call setup request. The conference bridge connects a voice connection for each of the mobile devices. Each voice connection has an associated status. The voice connection is changed from one status to another status during the call without interfering with the voice connection status of other mobile devices connected to the conference bridge.

The described systems and techniques can be implemented to provide push-to-talk services in a wireless network. Existing mobile service features are not impacted by the introduction of the push-to-talk service. The push-to-talk solution may be deployed in legacy GSM networks for GSM handsets without introducing any impact on legacy network entities. There may be no impact or change on any entity in the GSM legacy network when the push-to-talk solution is deployed. For example, the only impact may be on the handset, where the change may necessitate the implementation of a push-to-talk client. The push-to-talk solution may be also deployed in GSM/General Packet Radio Service (GPRS) networks for GSM/GPRS handsets without introducing any impact on the network entities. There may be no impact or change on any entity in the GSM/GPRS network when the push-to-talk solution is deployed. The push-to-talk solution may coexist with the Push-to-talk over Cellular (PoC) Open Mobile Alliance (OMA)-based solution for UMTS/GPRS session initiation protocol (SIP) handsets. For example, the push-to-talk solution may coexist with the PoC solution described in the OMA specifications (e.g., OMA-AD_PoC-V1_0-20040325-D, "Push to talk over Cellular (PoC)—Architecture", Draft Version 1.0—25 Mar. 2004). Some or all of the foregoing advantages and characteristics of the described systems and techniques can be realized in specific implementations.

The details of one or more implementations are set forth in the accompanying drawings and the description below. Other features, advantages, and characteristics will be apparent from the description and drawings, and from the claims.

DESCRIPTION OF DRAWINGS

Like reference symbols in the various drawings indicate like elements.

DETAILED DESCRIPTION

Figure 1:
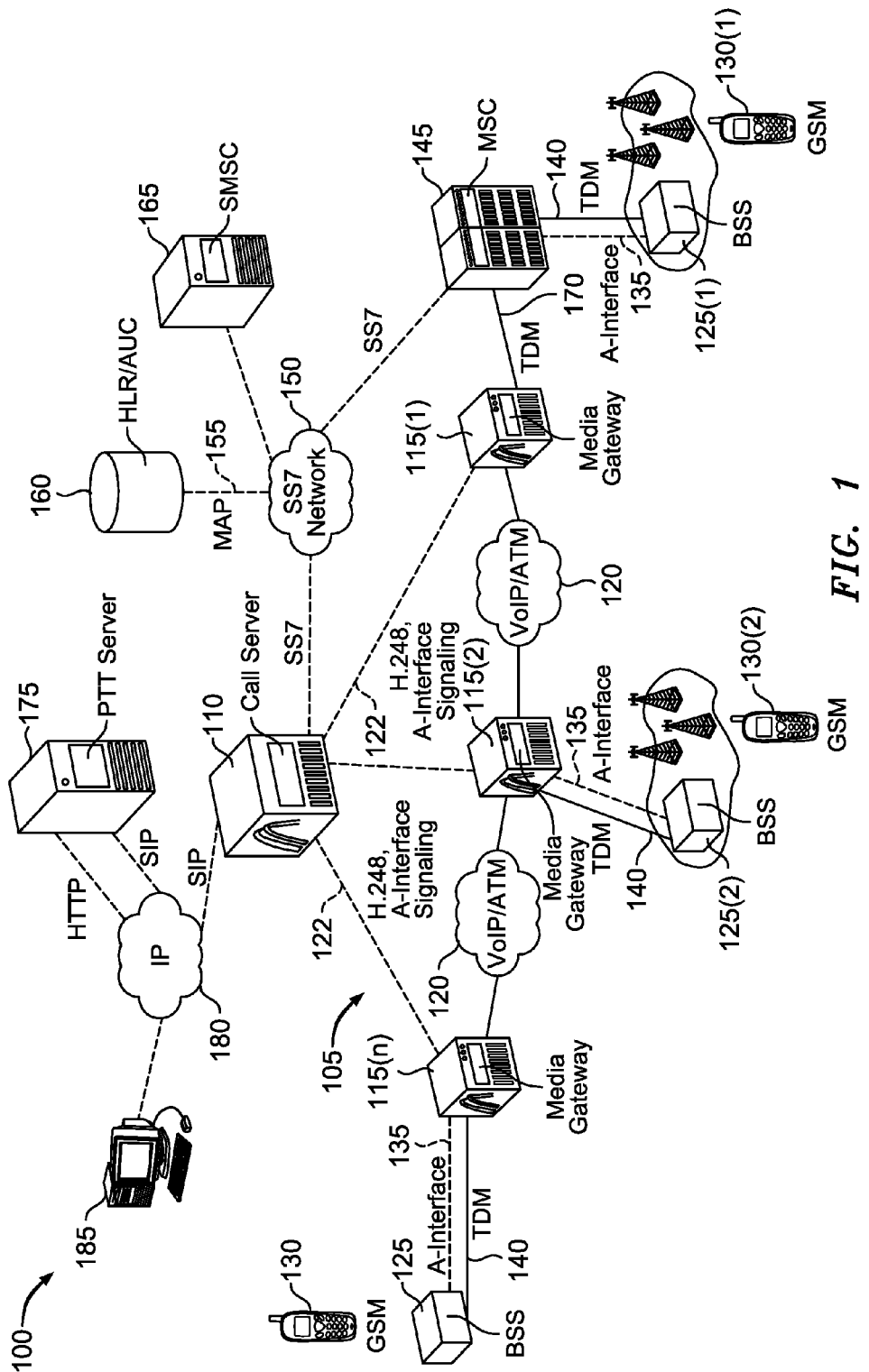
FIG. 1 is a block diagram of a telecommunications network that includes a distributed mobile switching center (MSC).

FIG. 1 is a block diagram of a telecommunications network 100 that includes a distributed mobile switching center (MSC) 105, such as the Alcatel 5020 Spatial Atrium MSC available from Alcatel (e.g., Alcatel of Richardson, Tex.), and that supports a push-to-talk service. The push-to-talk service can be deployed over a GSM network, without impacting GSM network entities. The push-to-talk service can be used on mobile stations 130 that support voice, USSD, and SMS and that include a push-to-talk client for handling push-to-talk signaling to and from the mobile station 130. Some or all supplementary services may also be supported and used during a PTT session.

The distributed MSC 105 includes a call server 110 that controls multiple media gateways (MGWs) 115(1) ... 115(n), which are connected by interconnections 120 through which voice bearer traffic can be routed between different media gateways 115. The interconnections 120 can use voice over IP (VoIP) and/or asynchronous transfer mode (ATM) for physically connecting the different media gateways 115. The media gateways 115 can be geographically distributed over a relatively wide area. Because the VoIP/ATM networks 120 can be owned by a network operator voice traffic, such as push-to-talk traffic, can be routed between different media gateways 115 instead of incurring long distance costs associated with, for example, routing calls through an inter-exchange carrier (e.g., in a Signaling System No. 7 (SS7) network 150).

In the distributed MSC 105, the call server 110 handles signaling and control functions for the distributed MSC 105, including voice media control and management, talk toggling control between push-to-talk users during a push-to-talk session, control of media gateways 115, unstructured supplementary service data (USSD) messaging, short message service (SMS) messaging, and SS7 messaging (e.g., handoffs and call setup with other mobile switching centers). The media gateways 115 handle, generally under the control of the call server 110, voice bearer channels; switching between and among time division multiplexing (TDM), IP, and ATM; bridging between users in a push-to-talk group; and call context operations and manipulations.

The call server 110 communicates with the media gateways 115 using H.248 protocol 122. Each media gateway 115 is associated with one or more base station systems 125 that include a number of base stations that serve different geographical areas. Each base station provides radio access in one or more cells for communications with mobile stations 130. Each base station system 125 exchanges signaling with its corresponding media gateway 115 using an A-interface 135 and transmits voice traffic over a TDM channel 140. In this architecture example, the A-interface signaling is transferred from the media gateway 115 to the call server 110 transparently. This is done to facilitate interconnectivity deployment in the network and is used as an example for purposes of this description. In some implementations, the call server 110 directly exchanges A-interface signaling with the base station systems 125.

One or more of the media gateways 115 interface with a conventional MSC 145, which communicates with base station systems 125 using an A-interface 135 and a TDM channel 140. The MSC 145 is connected to an SS7 network 150, through which SS7 signaling can be exchanged with other MSCs (not shown), the call server 110, and other network entities. For example, the call server 110 and the MSC 145 can exchange mobile application part (MAP) messages through a MAP link 155 with a home location register (HLR) 160 through the SS7 network 150 and can exchange SMS messages with a SMS center (SMSC) 165. In general, each mobile station 130 is associated with an HLR 160, which stores location data relating to a current location of the mobile station and subscription data, such as identifications of services to which a user of the mobile station 130 subscribes. The SMSC 165 handles SMS traffic. When an SMS message is sent from one mobile station 130 to another, the SMS message is routed to the SMSC 165, which stores the SMS message until the mobile station 130 can be located for delivery of the SMS message.

When a call is placed from a calling mobile station 130(1) in a base station system 125(1) controlled by the conventional MSC 145 to a called mobile station 130(2) in a base station system 125 controlled by the distributed MSC 105, the MSC 145 routes the call through a TDM channel 170 to a media gateway 115(1) in the cellular network and sends signaling data to the call server 110 through the SS7 network 150. The call server 110 sends signaling data through a media gateway 115(2) to a base station controller 125(2) serving an area in which the mobile station 130(2) is located for establishing a radio connection with the mobile station 130(2). In addition, the call server 110 directs the media gateway 115(1) connected to the incoming TDM channel 170 to route the call through an interconnection 120 to the media gateway 115(2) that is capable of connecting with the base station controller 125 serving the mobile station 130(2). The call server 110 also directs the serving media gateway 115(2) to route the call through a terminating TDM channel 140 to the base station controller 125(2) to establish a call connection between the calling mobile station 130(1) and the called mobile station 130(2).

For supporting push-to-talk services, the telecommunications network 100 also includes a push-to-talk server 175. The call server 110 communicates with the push-to-talk server 175 through a network 180, such as the Internet, using SIP messaging. In general, the push-to-talk server 175 can manage push-to-talk subscriber list management and push-to-talk user presence and availability management (e.g., mobile station location and/or activation status of a push-to-talk service). Each push-to-talk subscriber can be associated with one or more push-to-talk groups that include identification information (e.g., a mobile station international ISDN number (MSISDN)) for mobile stations belonging to two or more push-to-talk users. The members of each group can be identified in a list that is stored and managed by the push-to-talk server 175.

The push-to-talk server 175 can also provide a hypertext transfer protocol (HTTP) access interface to the network 180 to allow users access using HTTP clients 185. An HTTP client 185 can access the push-to-talk server 175 to create a new push-to-talk user account and to provide or update subscriber information. In addition, an HTTP client 185 can be used for push-to-talk group list management (e.g., to create a new group, add/remove users from an existing group, delete a group, and the like). Other types of clients, protocols, and communication links can be used for account and group list management, including clients that include push-to-talk client software for generating messages in a format used by the push-to-talk server 175 and clients that use a browser to access an application service provider included in the push-to-talk server 175. Push-to-talk group management tasks can also be performed from a mobile station 130 that has Internet access capabilities or using special push-to-talk client software that communicates with the push-to-talk server 175 through a wireless network (e.g., through an SS7 network 150 and/or a distributed MSC 105 using USSD messaging). In some cases, each group is "owned" by a particular subscriber who has view and edit privileges, while other subscribers may only have permission to view the group members.

To use a push-to-talk service in accordance with some implementations, a mobile station 130 supports special functions, which generally may be implemented through software installed on a mobile device. The special functions may include a push-to-talk client application and special dual tone multi-frequency (DTMF) tone management. The push-to-talk client interfaces with a USSD application on the mobile station 130 to communicate to the network push-to-talk list management activities executed by the user on the list stored on the mobile device 130. This may include creating a new group, adding/removing names from an existing group, creating a new push-to-talk user account, etc. In addition, the push-to-talk client can interface with the USSD application to send a USSD origination session message for activating (or deactivating) a push-to-talk service. The USSD origination session message can be transmitted immediately after powering-up the mobile station 130 and/or in response to a user interaction with the mobile station 130 and/or the push-to-talk client (e.g., selection of a push-to-talk menu option).

The push-to-talk client also interfaces with an SMS application on the mobile station 130 to map downstream push-to-talk group list management functions to the push-to-talk list stored on the mobile station 130 (e.g., to receive a push-to-talk list update and to stored the updated information in a local push-to-talk list). This capability can be used, for example, to update the list on the mobile station 130 when an update request is originated by the push-to-talk server 175 in response to an update made using an HTTP client 185.

The mobile station 130 also includes a button for the push-to-talk application. In some implementations, pressing and holding the push-to-talk button causes the mobile station 130 to send a single burst DTMF tone, which may be designated as a "talk" DTMF tone. The "talk" DTMF tone is used to communicate to a node managing the push-to-talk session that the user is requesting speech control of a push-to-talk conference bridge. For example, the push-to-talk service establishes a conference bridge between two or more connected mobile stations 130. Each mobile station 130 can, as a default, have a one-way (e.g., downstream) connection to the conference bridge. In response to pushing the push-to-talk button, a request is sent for voice control of the push-to-talk session. If granted, the connection for the mobile station 130 can be changed to a two-way connection, thereby allowing the user's speech to be transmitted to the other members of the push-to-talk session.

Releasing the push-to-talk button causes the mobile station 130 to send a single burst DTMF tone that is different than the "talk" DTFM tone and that is designated as a "listen" tone. The "listen" tone, is used, for example, to change the mobile station 130 from a two-way connection to a one-way connection, in which the mobile station 130 is capable of receiving speech signals transmitted from other members of the push-to-talk session. In some cases, a conflict resolution procedure can be implemented to select among multiple users who are pushing the push-to-talk button at the same time. In other implementations, multiple users may be allowed to have simultaneous voice control.

Figure 2:
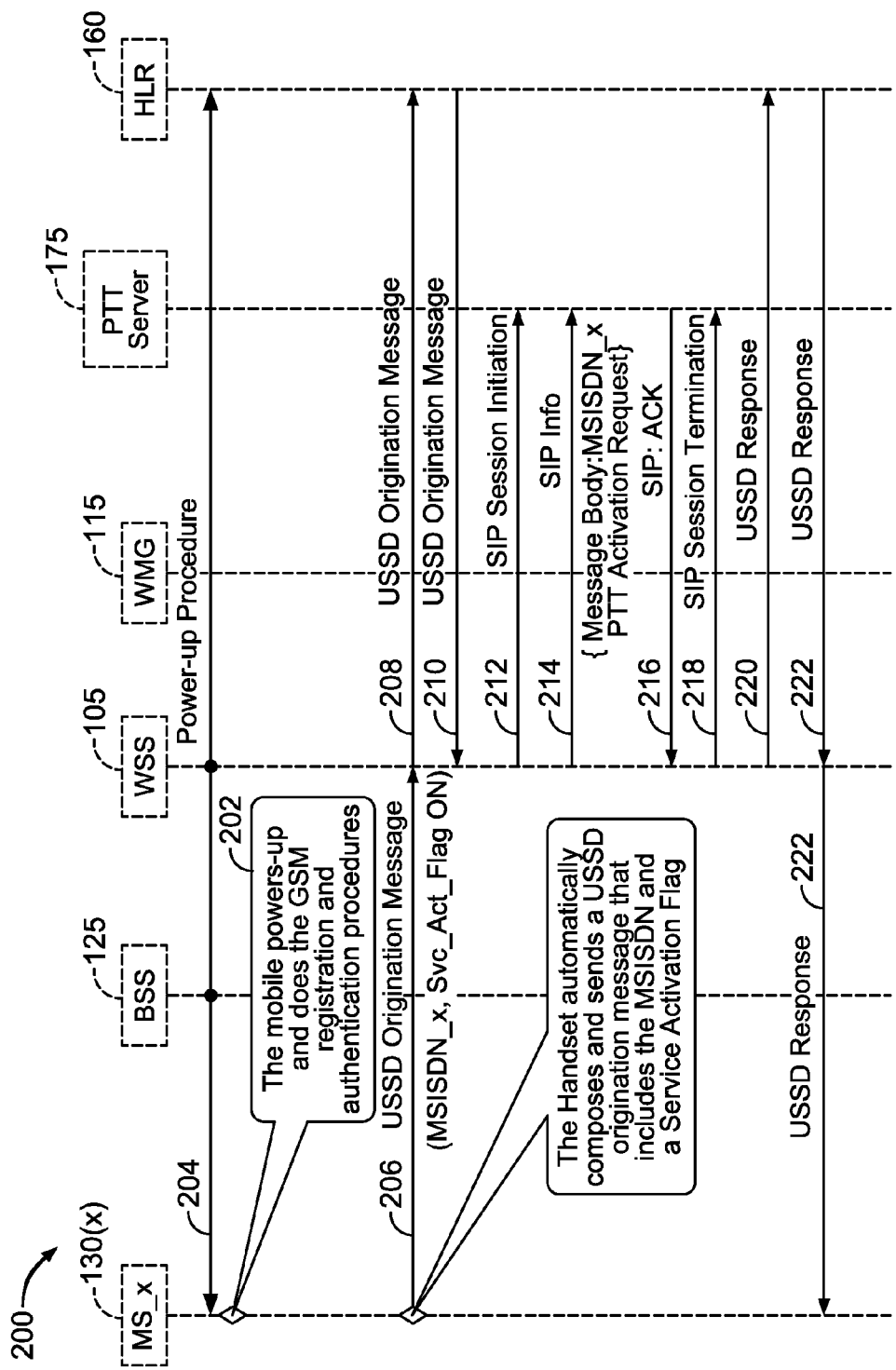
FIG. 2 is a signaling and flow diagram of a process for activating a push-to-talk service.

FIG. 2 is a signaling and flow diagram of a process 200 for activating a push-to-talk service. A mobile station 130(x) is powered up and performs registration and authentication procedures (202) by, among other things, communicating (204) with a home location register through a base station system 125 and a serving distributed MSC 105, such as a wireless soft switch (WSS). Using a push-to-talk client on the mobile station 130(x), a USSD origination message 206 is composed and sent to the serving distributed MSC 105. The USSD origination message 206 includes an MSISDN for the mobile station 130(x) and a service activation flag indicating that the push-to-talk service is to be activated. The serving distributed MSC 105 forwards the USSD origination message 208 to an HLR 160 associated with the mobile station 130(x). The HLR 160 can be used, for instance, to confirm that the mobile station 130(x) includes a push-to-talk subscription. The HLR 160 sends a corresponding USSD origination message 210 to the serving distributed MSC 105. In some cases, such as when the mobile station 130(x) is located in an area served by an MSC that does not support the push-to-talk service, the HLR 160 may send the USSD origination message 210 to a different MSC, which serves as an anchor MSC for the push-to-talk service. In addition, although the serving and anchor MSC in this example is a distributed MSC 105, conventional MSCs 145 can also be used to support the push-to-talk service.

The distributed MSC 105 sends an SIP session initiation message 212 to a push-to-talk server 175 and, after initiating the session, sends an SIP information message 214 to the push-to-talk server 175. The SIP information message 214 includes the MSISDN for the mobile station 130(x) and a push-to-talk activation request. In response, the push-to-talk server 175 can update push-to-talk user presence and availability data and can use the activation request to notify groups, in which the mobile station 130(x) is a member, that the mobile station 130(x) is currently available.

The push-to-talk server 175 returns an acknowledgement message 216 to acknowledge receipt of the SIP information message 214. The distributed MSC 105 sends an SIP session termination message 218 indicating that the SIP session is complete. The distributed MSC 105 then sends a USSD response message 220 to the HLR 160, which sends a corresponding USSD response message 222 to the mobile station 130(x) through the serving distributed MSC 105. The USSD messaging is routed through the HLR 160 because, although the serving MSC and the anchor MSC in this example are one and the same, they can be different nodes in some situations and because there may be a need to store push-to-talk status information in the HLR 160.

Although FIG. 2 illustrates a process 200 for activating a push-to-talk service upon power-up, the activation process 200 can be used to perform push-to-talk service activation in response to other triggering activities, such as a user selection of a push-to-talk service activation option on a menu for the push-to-talk client. Similarly, the activation process 200 can be used to send automatic periodic re-activation requests, which may be necessary to notify the push-to-talk server 175 that the mobile station 130(x) remains powered-up and to prevent the push-to-talk server 175 from instituting a time-out procedure that assumes the push-to-talk user is no longer available (e.g., by updating the push-to-talk user presence and availability data accordingly). In response to an automatic periodic re-activation request, the push-to-talk server 175 may simply reset a time-out timer associated with the mobile station 130(x). The activation process 200 can also be used to de-activate the push-to-talk service, such as in response to a user selection of a push-to-talk service de-activation option on a menu for the push-to-talk client. A de-activation procedure is essentially the same as the described activation process 200, except that the service activation flag in the USSD origination message 206 indicates that the service is to be de-activated, the SIP information message 214 includes a de-activation request, and the push-to-talk server 175 performs different operations in response to the SIP information message 214.

Figure 3:
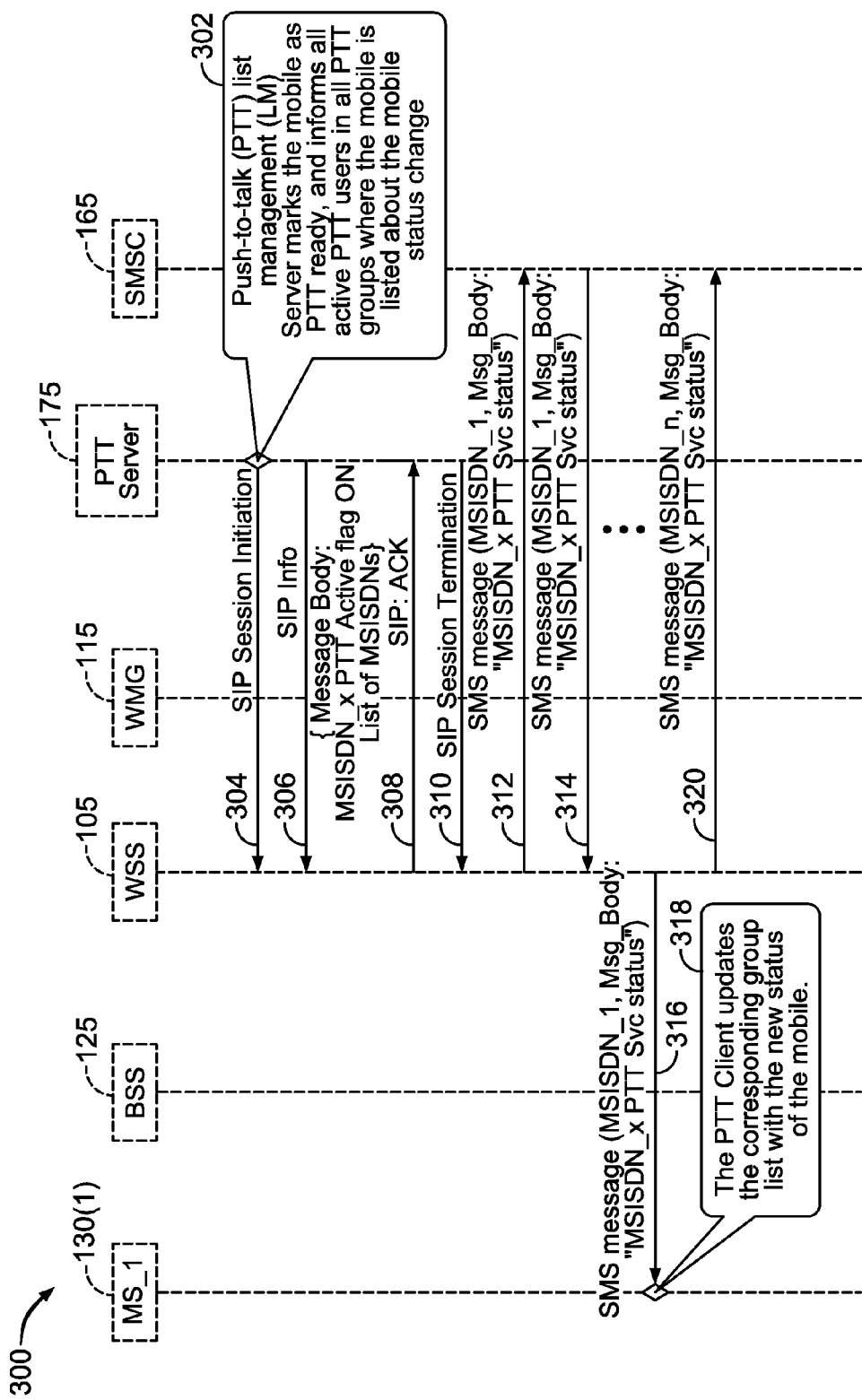
FIG. 3 is a signaling and flow diagram of a process for notifying members of a push-to-talk group in response to a push-to-talk service activation or de-activation.

FIG. 3 is a signaling and flow diagram of a process 300 for notifying members of a push-to-talk group in response to a push-to-talk service activation or de-activation. In response, for example, to the SIP information message 214 (see FIG. 2), the push-to-talk server 175 stores data indicating that a particular mobile station 130(x) is push-to-talk-ready and identifies all of the mobile stations 130 that are members of a push-to-talk group to which the mobile station 130(x) belongs (302). The push-to-talk server 175 sends a SIP session initiation message 304 to a node, such as a distributed MSC 105, that serves as an anchor MSC for the notification process 300. The push-to-talk server 175 also sends a SIP information message 306 that includes an MSISDN for the particular mobile station 130(x), a push-to-talk service status for the particular mobile station 130(x) (e.g., active or inactive), and identification information for each mobile station 130 in a list of mobile stations 130 identified by the push-to-talk server 175. The identification information can include, for example, an MSISDN for each mobile station 130.

The distributed MSC 105 returns an acknowledgement message 308 to acknowledge receipt of the SIP information message 306. The push-to-talk server 175 sends an SIP session termination message 310 indicating that the SIP session is complete. The distributed MSC 105 then sends an SMS message 312 to an SMSC 165 associated with a first mobile station 130(1). The SMS message 312 is addressed to the first mobile station 130(1) and includes, in a message body, the MSISDN for the particular mobile station 130(x) and an indication of the corresponding push-to-talk service status. The SMSC 165 sends the SMS message 314 to an MSC, such as the distributed MSC 105, a different distributed MSC, or a conventional MSC, serving an area in which the first mobile station 130(1) is located. The distributed MSC 105 sends the SMS message 316 to the first mobile station 130(1). A push-to-talk client on the first mobile station 130(1) updates (318) one or more push-to-talk group lists that are stored on the first mobile station 130(1) and that are for groups that include the particular mobile station 130(x) with the new status of the particular mobile station 130(x).

SMS messages 320, analogous to the SMS message 312 addressed to the first mobile station 130(1), are sent to each mobile station 130 identified by the push-to-talk server 175. Each SMS message 320 is addressed to one of the mobile stations 130(n) and includes, in a message body, the MSISDN for the particular mobile station 130(x) and an indication of the corresponding push-to-talk service status. Each SMS message 320 is sent to an SMSC 165 corresponding to the addressed mobile station 130(n). The SMSC 165, in turn, sends the SMS message 320 to an MSC 105 serving an area in which the addressed mobile station 130(n) is currently located (e.g., as determined by the SMSC 165 by retrieving information from an appropriate HLR 160). In some implementations, the notification process 300 may be performed for multiple different groups of which the particular mobile station 130(x) is a member. In other implementations, a push-to-talk service may be invoked for only one group at a time.

Figure 4:
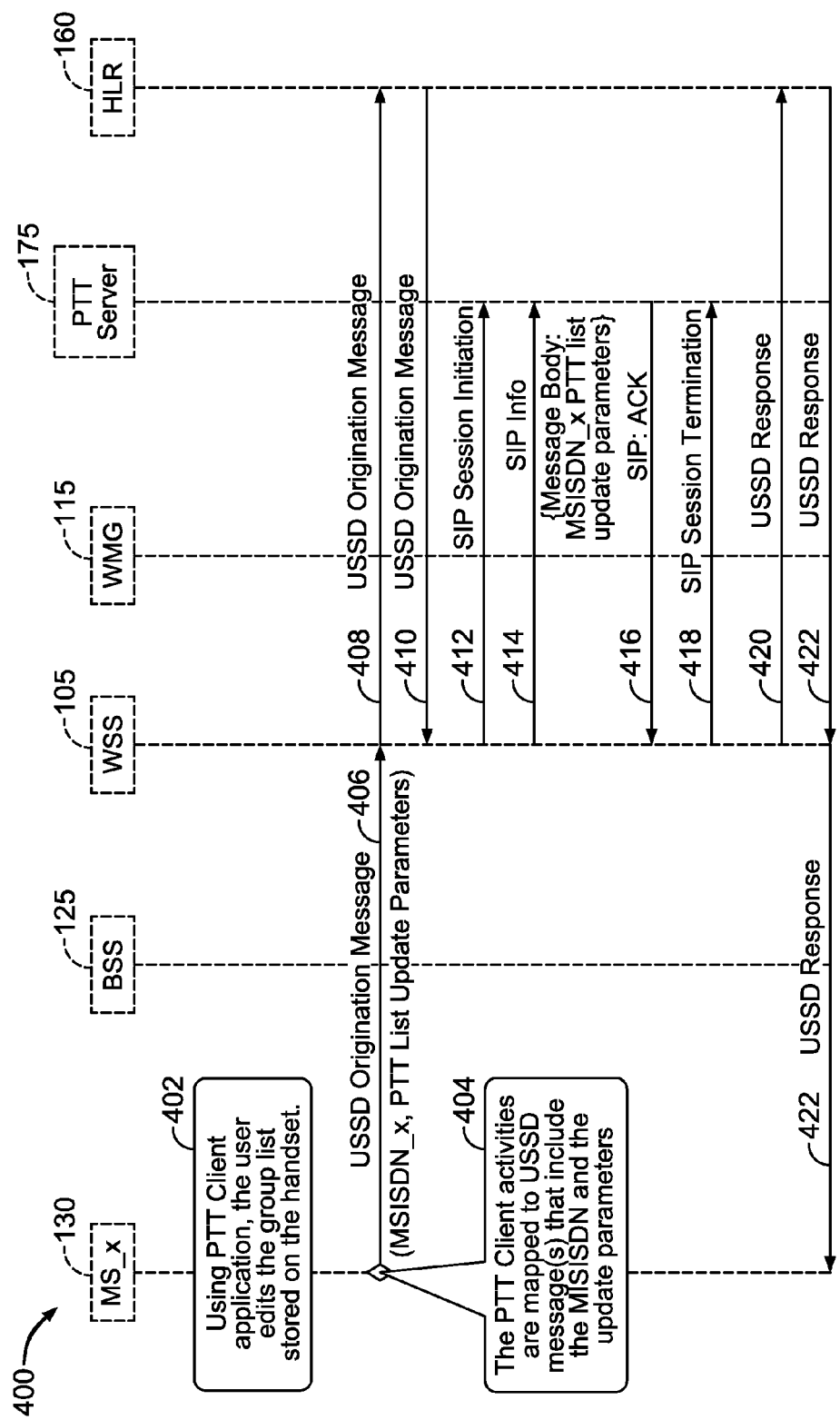
FIG. 4 is a signaling and flow diagram of a process for modifying a push-to-talk group list from a mobile device.

FIG. 4 is a signaling and flow diagram of a process 400 for modifying a push-to-talk group list from a mobile device. A user adds, edits, or deletes a push-to-talk group and/or members of a push-to-talk group using a push-to-talk client application on a mobile station 130 (402). For example, the push-to-talk client application can provide a user interface for modifying push-to-talk groups. The push-to-talk client application generates a USSD origination message that includes the MSISDN for the mobile station 130 and the updated information (404). The mobile station 130 sends the USSD origination message 406 to the serving distributed MSC 105. The serving distributed MSC 105 forwards the USSD origination message 408 to an HLR 160 associated with the mobile station 130. The HLR 160 sends a corresponding USSD origination message 410 to the serving distributed MSC 105. In some cases, such as when the mobile station 130 is located in an area served by an MSC that does not support the push-to-talk service, the HLR 160 may send the USSD origination message 410 to a different MSC, which serves as an anchor MSC for the push-to-talk service. In addition, although the serving and anchor MSC in this example is a distributed MSC 105, conventional MSCs 145 can also be used to support the push-to-talk service.

The distributed MSC 105 sends an SIP session initiation message 412 to a push-to-talk server 175 and, after initiating the session, sends an SIP information message 414 to the push-to-talk server 175. The SIP information message 414 includes the MSISDN for the mobile station 130 and the update parameters for the push-to-talk group list. In response, the push-to-talk server 175 updates stored group information. The push-to-talk server 175 returns an acknowledgement message 416 to acknowledge receipt of the SIP information message 414. The distributed MSC 105 sends an SIP session termination message 418 indicating that the SIP session is complete. The distributed MSC 105 then sends a USSD response message 420 to the HLR 160, which sends a corresponding USSD response message 422 to the mobile station 130 through the serving distributed MSC 105.

Figure 5:
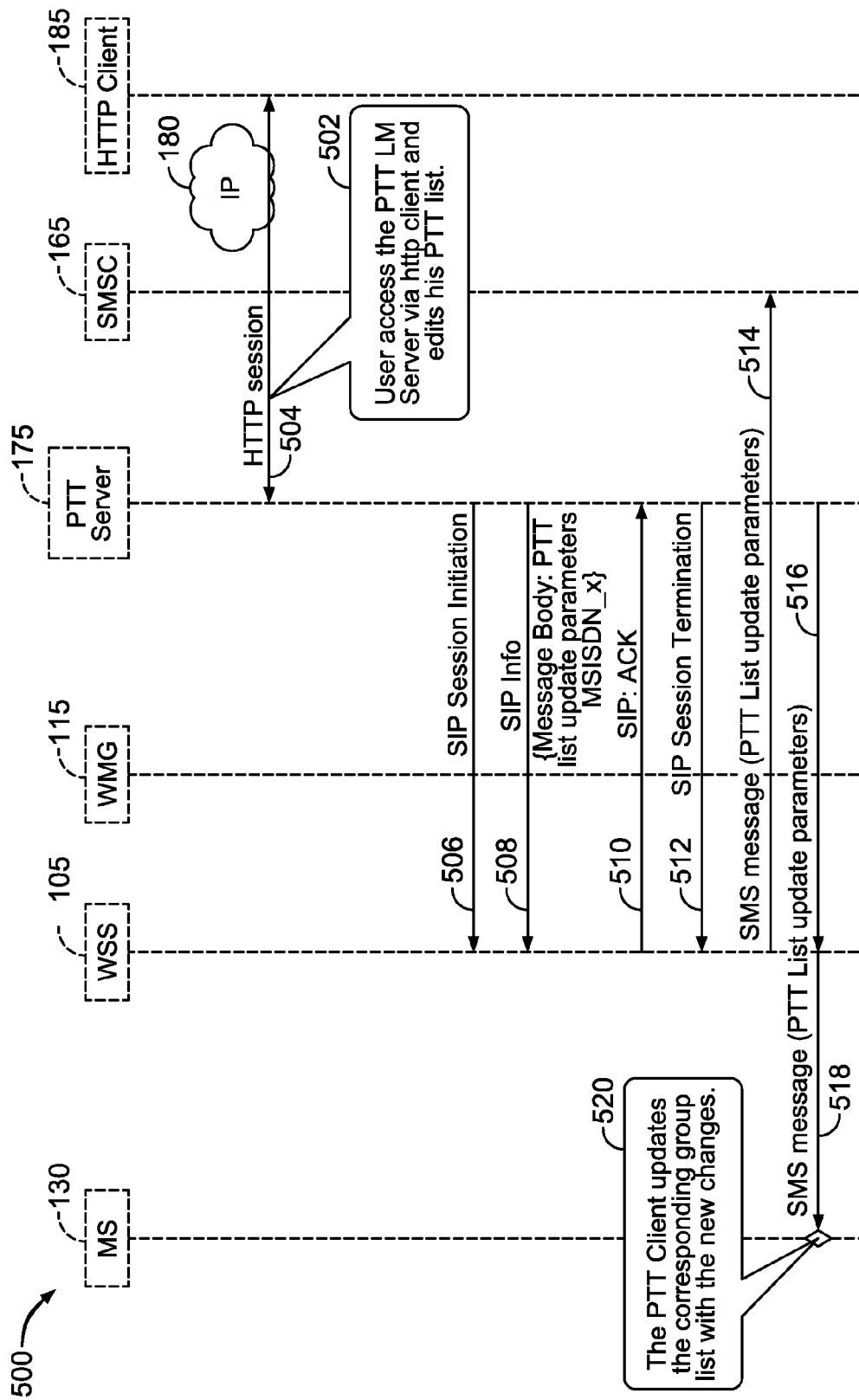
FIG. 5 is a signaling and flow diagram of a process for updating a push-to-talk group list on a mobile device from a push-to-talk server.

FIG. 5 is a signaling and flow diagram of a process 500 for updating a push-to-talk group list on a mobile device from a push-to-talk server 175. The process 500 can be used to inform mobile stations of changes to a push-to-talk group list that are made to a master group list stored on the push-to-talk server 175. A user edits (502) a push-to-talk group list from an HTTP client 185 in an HTTP session 504 conducted over an IP network 180. Alternatively, the push-to-talk group list in the push-to-talk server 175 might be edited from a particular mobile device (as described in the modification process 400 of FIG. 4), and the update process 500 can be used to update corresponding group lists in another mobile station 130.

The push-to-talk server 175 sends a SIP session initiation message 506 to a node, such as a distributed MSC 105, that serves as an anchor MSC for the update process 500. The push-to-talk server 175 also sends a SIP information message 508 that includes push-to-talk group list update parameters and an MSISDN for a mobile station 130 to be updated. The distributed MSC 105 returns an acknowledgement message 510 to acknowledge receipt of the SIP information message 508. The push-to-talk server 175 sends an SIP session termination message 512 indicating that the SIP session is complete. The distributed MSC 105 then sends an SMS message 514 to an SMSC 165 associated with the mobile station 130. The SMS message 514 is addressed to the mobile station 130 and includes, in a message body, the MSISDN for the mobile station 130 and the update parameters for the push-to-talk group list. The SMSC 165 sends the SMS message 516 to an MSC, such as the distributed MSC 105, a different distributed MSC, or a conventional MSC, serving an area in which the mobile station 130 is located, and the distributed MSC 105 sends the SMS message 518 to the mobile station 130. A push-to-talk client on the first mobile station 130(1) updates (520) a push-to-talk group list stored on the mobile station 130 using the update parameters.

Figure 6:
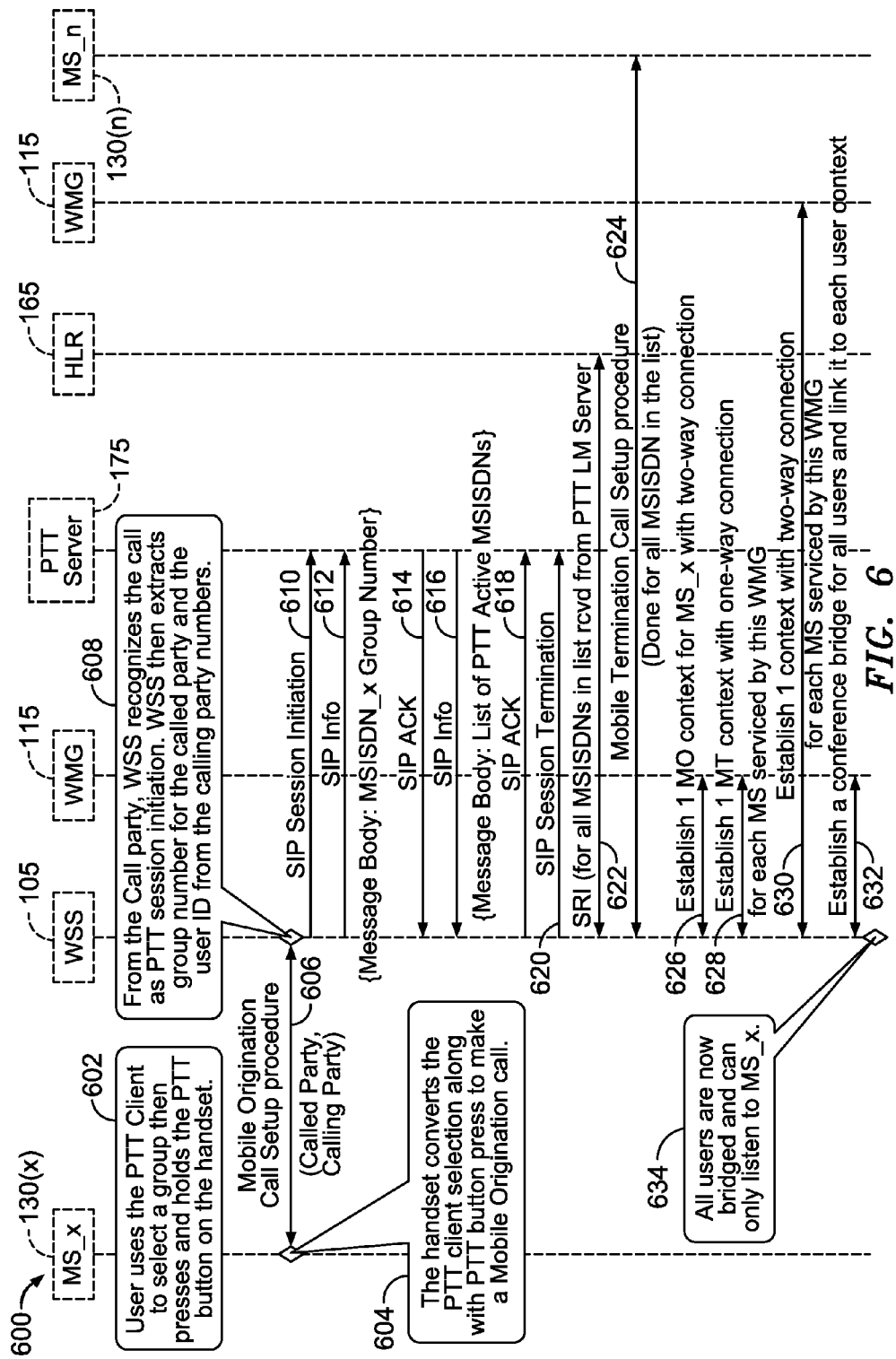
FIG. 6 is a signaling and flow diagram of a process for initiating a push-to-talk session from a serving MSC that supports the push-to-talk techniques described herein.

FIG. 6 is a signaling and flow diagram of a process 600 for initiating a push-to-talk session from a serving MSC that supports the described push-to-talk techniques. A user of a particular mobile station 130(x) selects a push-to-talk group using a push-to-talk client application on the mobile station 130(x) and presses and holds a push-to-talk button on the mobile station 130(x) (602). The push-to-talk client application on the mobile station 130(x) determines that the user is attempting to initiate a push-to-talk session (604). A mobile origination call setup procedure 606 is initiated with a serving distributed MSC 105, in which the mobile station 130(x) informs the distributed MSC 105 of a called party number (e.g., MSISDN) and the calling party number or other identification. Based on the called party number received during the mobile origination call setup procedure 606, the distributed MSC 105 recognizes that the call is a push-to-talk session initiation. The distributed MSC 105 extracts or retrieves a group number based on the received called party number and a user identifier based on the calling party number (608).

The distributed MSC 105 then uses the group number to retrieve numbers (e.g., MSISDN numbers for the currently active members of the group). The distributed MSC 105 sends an SIP session initiation message 610 to a push-to-talk server 175 and, after initiating the session, sends a first SIP information message 612 to the push-to-talk server 175. The first SIP information message 612 includes the MSISDN for the initiating mobile station 130(x) and a group number for the group for which a push-to-talk session is to be initiated. The first SIP information message 612 serves as a request for a list of MSISDN numbers for members of the group that are currently active (e.g., mobile stations 130 that are powered-up and have an activated push-to-talk service). In some cases, the first SIP information message 612 can include the called party number, so that the push-to-talk server 175 only needs to determine that the call is associated with the push-to-talk server 175 and does not need to determine a group number. For example, an HLR 160 associated with the called party number can direct the distributed MSC 105 to contact the push-to-talk server 175 or the push-to-talk server 175 can be contained in such an HLR 160.

The push-to-talk server 175 returns an acknowledgement message 614 to acknowledge receipt of the first SIP information message 612. In response to the first SIP information message 612, the push-to-talk server 175 sends a second SIP information message 616 to the distributed MSC 105. The second SIP information message 616 includes a list of MSISDN numbers for members of the group that are currently active, as determined by the push-to-talk server 175 based on the received group number. The distributed MSC 105 returns an acknowledgement message 618 to acknowledge receipt of the second SIP information message 616. The distributed MSC 105 sends an SIP session termination message 620 indicating that the SIP session is complete.

The distributed MSC 105 then exchanges send routing information (SRI) messages 622 with one or more HLRs 160 (e.g., the HLRs 160 associated with each of the MSISDN numbers identified in the second SIP information message 616). Using routing information received from the HLRs 160, the distributed MSC 105 initiates a mobile termination call setup procedure 624 with each active mobile station 130(n) in the group. For example, a call setup request is sent to a serving MSC for each mobile station 130(n) to establish a connection with each mobile station 130(n). A mobile originating context is established (626) for the initiating mobile station 130(x) through a serving media gateway 115 (e.g., a wireless media gateway (WMG)) for the initiating mobile station 130(*x*). The mobile originating context is established with a two-way connection (i.e., because the user is holding the push-to-talk button, which enables the user to have temporary voice control of the push-to-talk session).

A mobile terminating context is established (628) for each mobile station 130 in the group that is also served by the same serving media gateway 115 as the initiating mobile station 130(*x*). A mobile terminating context is also established (630) for each mobile station 130(*n*) in the group that is served by a different media gateway 115. Mobile terminating contexts can also be established for mobile stations 130(*n*) in the group that are also served by conventional MSCs. Each mobile terminating context is established with a one-way connection (i.e., enabling the user to have a current listening status the push-to-talk session). A conference bridge is established (632) and used to link the contexts for all of the mobile stations 130 in the push-to-talk group. As a result, all of the mobile stations 130 are connected to a push-to-talk conference bridge (634) that, in this example, is currently under the voice control of the initiating mobile station 130(*x*).

Figure 7:
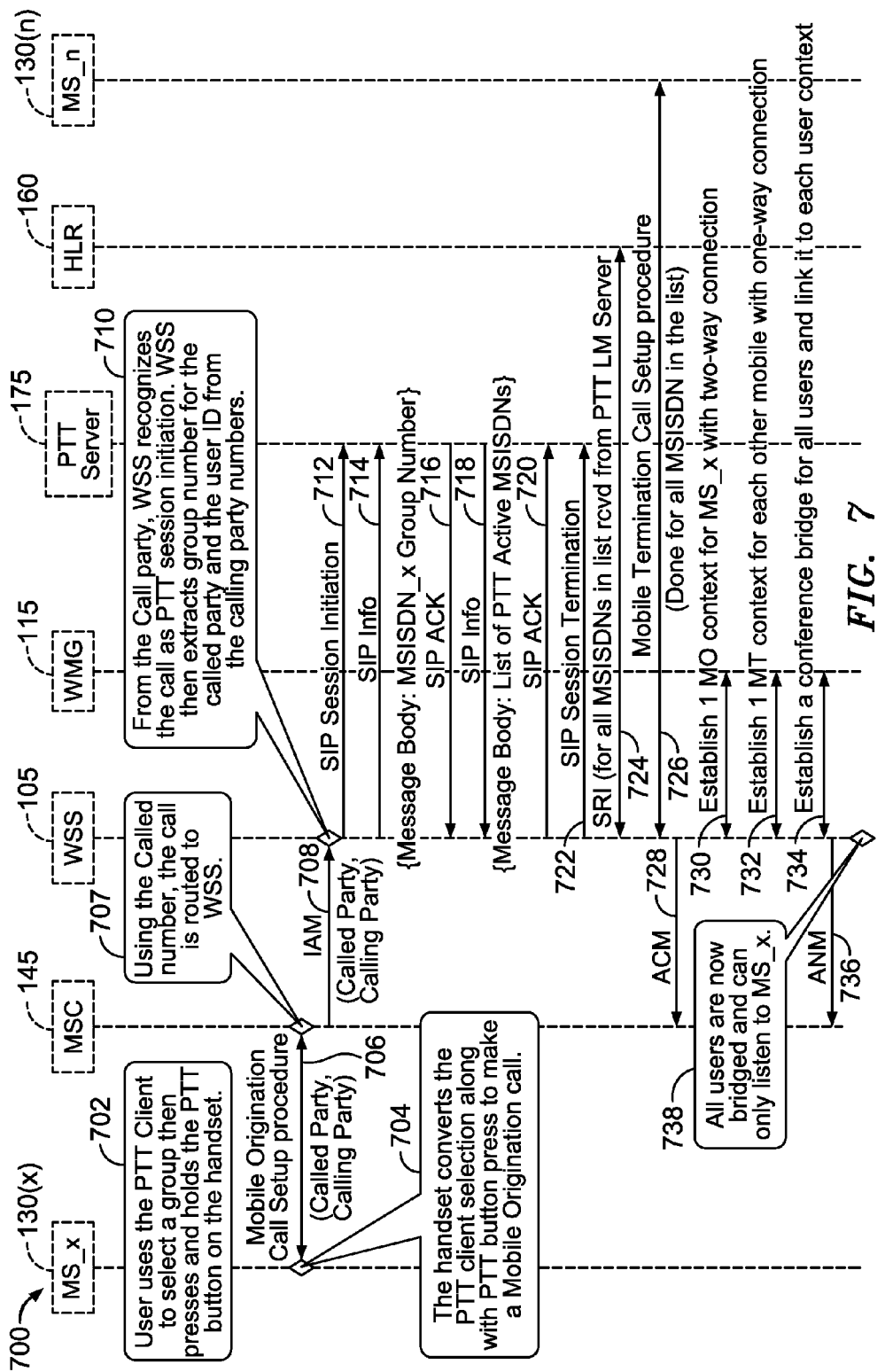
FIG. 7 is a signaling and flow diagram of a process for initiating a push-to-talk session from a serving MSC that does not support the push-to-talk techniques described herein.

FIG. 7 is a signaling and flow diagram of a process 700 for initiating a push-to-talk session from a serving MSC that does not support the described push-to-talk techniques. A user of a particular mobile station 130(*x*) selects a push-to-talk group using a push-to-talk client application on the mobile station 130(*x*) and presses and holds a push-to-talk button on the mobile station 130(*x*) (702). The push-to-talk client application on the mobile station 130(*x*) determines that the user is attempting to initiate a push-to-talk session (704). A mobile origination call setup procedure 706 is initiated with a serving MSC 145, in which the mobile station 130(*x*) informs the serving MSC 145 of a called party number (e.g., MSISDN) and the calling party number or other identification. Based on the called party number received during the mobile origination call setup procedure 706, the serving MSC 145 identifies a distributed MSC 105 to which the call should be routed (707). For example, the serving MSC 145 requests and receives routing information from an HLR 160 associated with the called party number using a send routing information procedure.

The serving MSC 145 sends an initial address message (IAM) 708 identifying the called party number and the calling party number to the distributed MSC 105. Based on the called party number received in the IAM 708, the distributed MSC 105 recognizes that the call is a push-to-talk session initiation. The distributed MSC 105 extracts or retrieves a group number based on the received called party number and a user identifier based on the calling party number (710). The distributed MSC 105 then uses the group number to retrieve numbers (e.g., MSISDN numbers for the currently active members of the group).

The distributed MSC 105 sends an SIP session initiation message 712 to a push-to-talk server 175 and, after initiating the session, sends a first SIP information message 714 to the push-to-talk server 175. The first SIP information message 714 includes the MSISDN for the initiating mobile station 130(*x*) and a group number for the group for which a push-to-talk session is to be initiated. The first SIP information message 714 serves as a request for a list of MSISDN numbers for members of the group that are currently active (e.g., mobile stations 130 that are powered-up and have an activated push-to-talk service). In some cases, the first SIP information message 714 can include the called party number, so that the push-to-talk server 175 only needs to determine that the call is associated with the push-to-talk server 175 and does not need to determine a group number. For example, an HLR 160 associated with the called party number can direct the distributed MSC 105 to contact the push-to-talk server 175 or the push-to-talk server 175 can be contained in such an HLR 160.

The push-to-talk server 175 returns an acknowledgement message 716 to acknowledge receipt of the first SIP information message 714. In response to the first SIP information message 714, the push-to-talk server 175 sends a second SIP information message 718 to the distributed MSC 105. The second SIP information message 718 includes a list of MSISDN numbers for members of the group that are currently active, as determined by the push-to-talk server 175 based on the received group number. The distributed MSC 105 returns an acknowledgement message 720 to acknowledge receipt of the second SIP information message 718. The distributed MSC 105 sends an SIP session termination message 722 indicating that the SIP session is complete.

The distributed MSC 105 then exchanges send routing information (SRI) messages 724 with one or more HLRs 160 (e.g., the HLRs 160 associated with each of the MSISDN numbers identified in the second SIP information message 718). Using routing information received from the HLRs 160, the distributed MSC 105 initiates a mobile termination call setup procedure 726 with each active mobile station 130(*n*) in the group. For example, a call setup request is sent to a serving MSC for each mobile station 130(*n*) to establish a connection with each mobile station 130(*n*). The distributed MSC 105 sends an address complete message (ACM) 728 to inform the serving MSC 145 that resources have been reserved for completing the call identified in the IAM.

A mobile originating context is established (730) for the initiating mobile station 130(*x*) through a media gateway 115 associated with the distributed MSC 105 and that is assigned to support the push-to-talk session for the initiating mobile station 130(*x*). Thus, the connection to the initiating mobile station 130(*x*) is routed through the assigned media gateway 115. The mobile originating context is established with a two-way connection (i.e., because the user is holding the push-to-talk button). A mobile terminating context is established (732) for each of the other mobile stations 130 in the group using the same or a different media gateway 115. Each mobile terminating context is established with a one-way connection. A conference bridge is established (734) and used to link the contexts for all of the mobile stations 130 in the push-to-talk group.

The distributed MSC 105 sends an answer message (ANM) 736 to inform the serving MSC 145 that the called party (i.e., the push-to-talk conference bridge) is connected. As a result, all of the mobile stations 130 are connected (738) to a push-to-talk conference bridge that, in this example, is currently under the voice control of the initiating mobile station 130(*x*). Thus, the push-to-talk session can be established in a manner that does not require the serving MSC 145 to support any special push-to-talk functions and that can extend into conventional GSM networks. Although the above description uses a conventional MSC 145 as an example of an MSC that does not support the described push-to-talk techniques, the described push-to-talk techniques can also be implemented in a conventional MSC 145.

Figure 8:
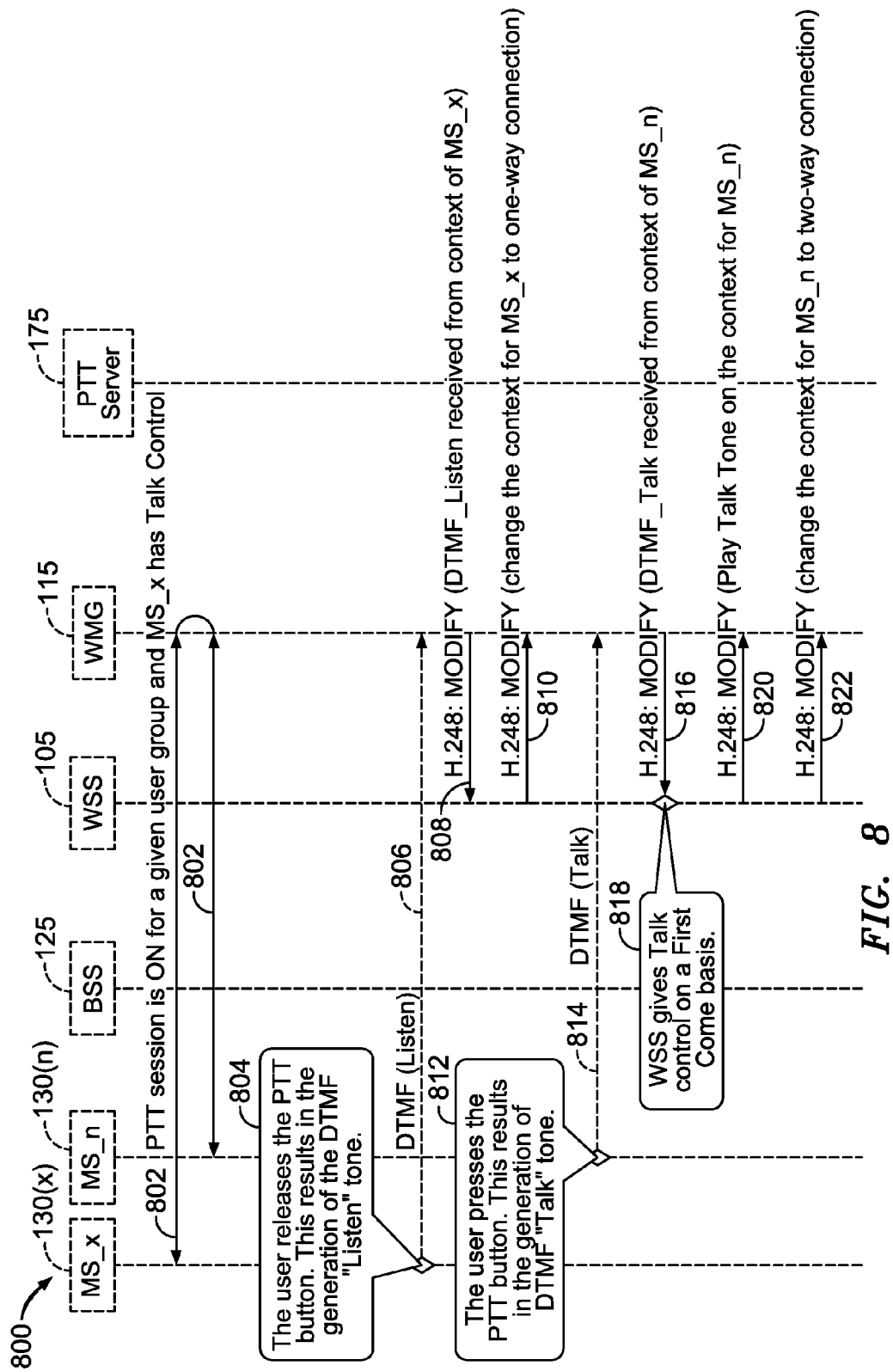
FIG. 8 is a signaling and flow diagram of a talk toggling control process.

FIG. 8 is a signaling and flow diagram of a talk toggling control process 800. As depicted in the figure, a group of mobile stations 130, including a particular mobile station 130(*x*) and at least one other mobile station 130(*n*), are involved in a push-to-talk session linked through a media gateway 115 and the particular mobile station 130(*x*) has talk control (802) (e.g., as a result of initiating a push-to-talk session, as shown in FIG. 7). Thus, the particular mobile station 130(*x*) has a two-way connection and the other mobile stations 130(n) have one-way connections. The user of the mobile station 130(x) releases the push-to-talk button (804), and, as a result, a push-to-talk client application causes the mobile station 130(x) to generate and send a DTMF "listen" tone 806 to the media gateway 115. The media gateway 115 sends a H.248 notify message 808 to the distributed MSC 105 indicating that the DTMF "listen" tone 806 was received from the context for the particular mobile station 130(x). The distributed MSC 105 responds with an H.248 modify message 810, which includes instructions to change the context for the particular mobile station 130(x) to a one-way connection.

A user of another mobile station 130(n) presses the push-to-talk button (812), and, as a result, a push-to-talk client application causes the mobile station 130(n) to generate and send a DTMF "talk" tone 814 to the media gateway 115. The media gateway 115 sends a H.248 notify message 816 to the distributed MSC 105 indicating that the DTMF "talk" tone 814 was received from the context for the mobile station 130(n). The distributed MSC 105 allocates talk control on a first come, first served basis (818) and responds with an H.248 notify response message 820, which includes instructions to play a talk tone on the context of the mobile station 130(n) to notify the user that the talk control is granted. In addition, the distributed MSC 105 sends a modify message 822, which includes instructions to change the context for the mobile station 130(n) to a two-way connection.

Figure 9:
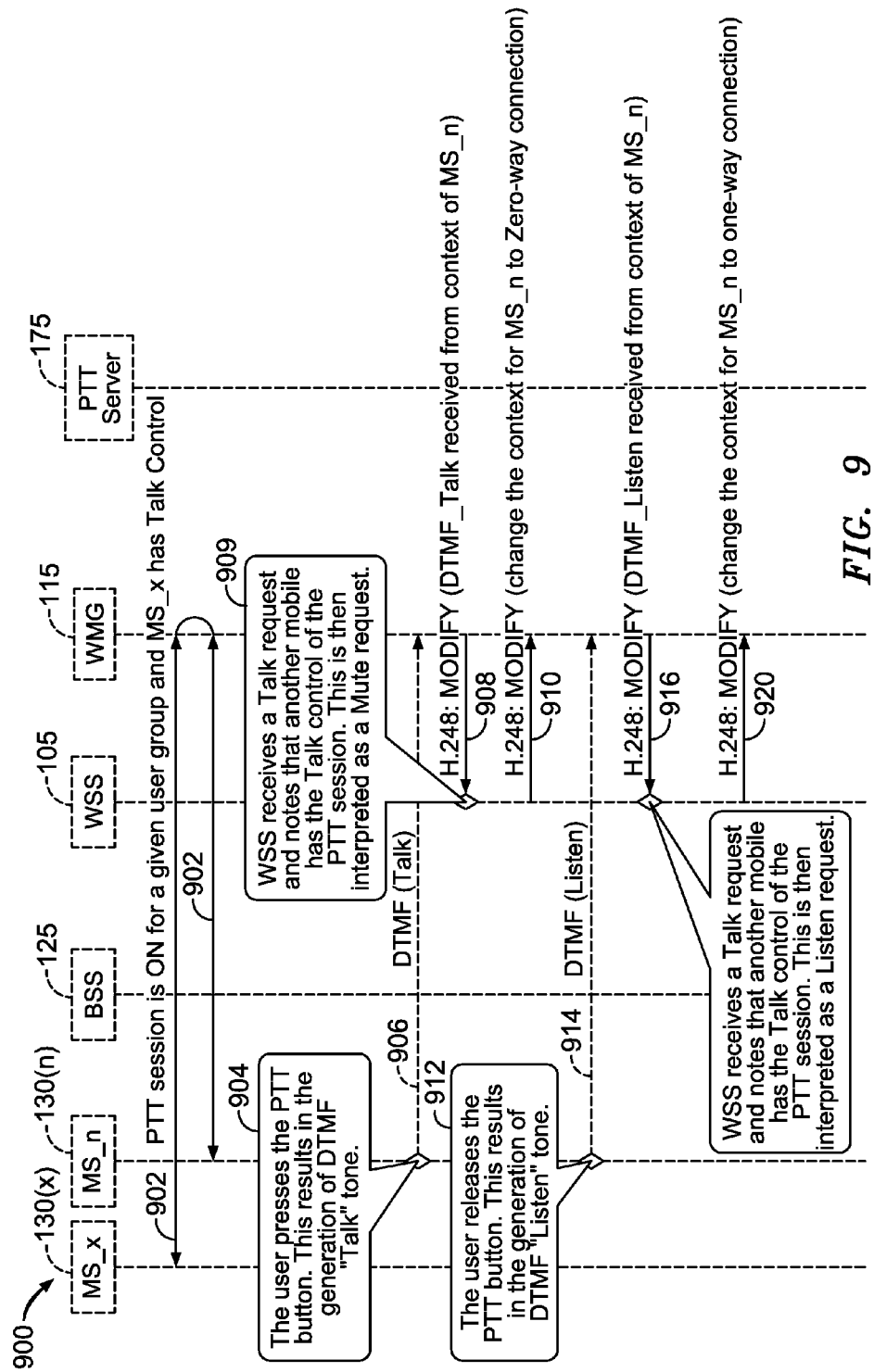
FIG. 9 is a signaling and flow diagram of another talk toggling control process.

FIG. 9 is a signaling and flow diagram of another talk toggling control process 900. As depicted in the figure, a group of mobile stations 130, including a particular mobile station 130(x) and at least one other mobile station 130(n), are involved in a push-to-talk session linked through a media gateway 115 and the particular mobile station 130(x) has talk control (902) (e.g., as a result of initiating a push-to-talk session, as shown in FIG. 7). Thus, the particular mobile station 130(x) has a two-way connection and the other mobile stations 130(n) have one-way connections. The user of one of the other mobile stations 130(n) presses the push-to-talk button (904), and, as a result, a push-to-talk client application causes the mobile station 130(n) to generate and send a DTMF "talk" tone 906 to the media gateway 115. The media gateway 115 sends a H.248 notify message 908 to the distributed MSC 105 indicating that the DTMF "talk" tone 906 was received from the context for the mobile station 130(n). In this example, based on the existing talk control by the particular mobile station 130(x), the distributed MSC 105 interprets the talk request as a mute request (909). Accordingly, the distributed MSC 105 responds with an H.248 modify message 910, which includes instructions to change the context for the mobile station 130(n) to a zero-way connection (e.g., to mute the signals from the particular mobile station 130(x)). In other implementations, the conflicting talk request can result in the distributed MSC 105 sending instructions for the push-to-talk client to play a tone indicating that talk control is not granted to the mobile station 130(n). Alternatively, in some cases, multiple mobile stations 130 can have talk control simultaneously.

The user of the mobile station 130(n) releases the push-to-talk button (912), and, as a result, a push-to-talk client application causes the mobile station 130(n) to generate and send a DTMF "listen" tone 914 to the media gateway 115. The media gateway 115 sends a H.248 notify message 916 to the distributed MSC 105 indicating that the DTMF "listen" tone 914 was received from the context for the mobile station 130(n). The distributed MSC 105 responds with an H.248 modify message 920, which includes instructions to change the context for the mobile station 130(n) to a one-way connection (i.e., to turn off the mute).

Pushing and releasing the push-to-talk button and the resulting DTMF tones allow the mobile voice connection (e.g., the context) to change from one status (e.g., one-way connection) to another (e.g., two-way connection) during the call without interfering with the voice connection status of other mobile devices that are on the same call, including without terminating the voice connection for all of the mobile devices on the call.

In some implementations, additional features can be included. For example, push-to-talk service numbers can be assigned or allocated for each push-to-talk group based on the geographical location of the nearest call server 110. A new mobile can be dynamically added to a live push-to-talk session. For example, a user can put the push-to-talk session on hold and contact another mobile station 130 that is not currently connected to the push-to-talk session and connect him to the live push-to-talk session. Another feature supported in the call server 110 can allow a distributed MSC 105 to request that the mobile station 130 originating the push-to-talk session provide its MSISDN during push-to-talk session initiation. For example, this feature may be needed in legacy networks where a conventional MSC 145 does not include the "calling party number" in the SS7 ISDN user part (ISUP) IAM message.

In some implementations, operational aspects of a push-to-talk solution may include affects on capacity, availability & redundancy, billing, performance indicators, management, events, and the like. For example, capacity of a push-to-talk solution may be updated to handle additional SMS, USSD, and SIP traffic. The push-to-talk system architecture may provide availability & redundancy using existing fault tolerance techniques. A billing record may be integrated into the existing telecommunications systems, which may provide users with one billing record for both push-to-talk and normal voice calls. The provision and configuration functions may be integrated into the push-to-talk solution.

Figure 10:
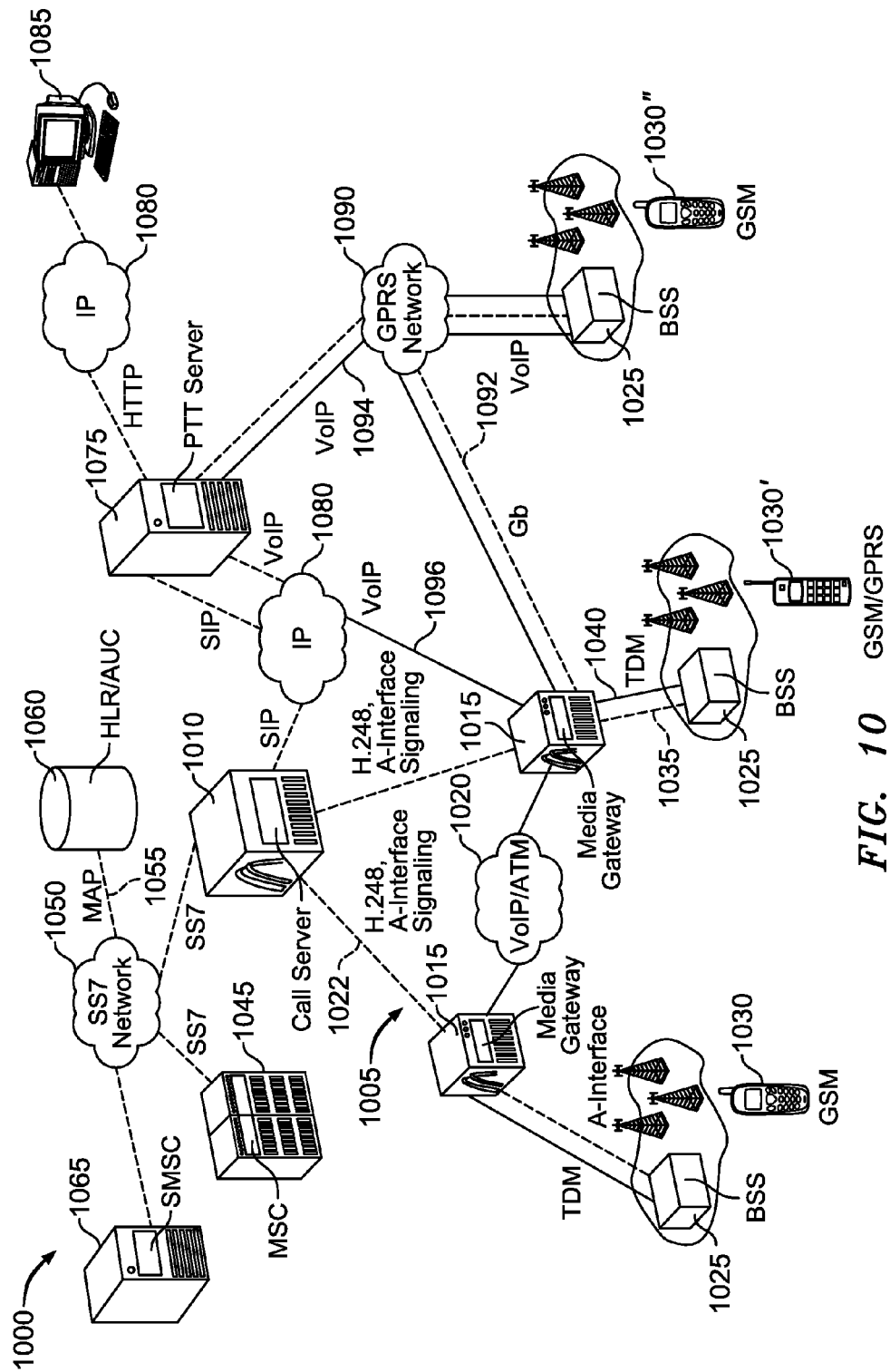
FIG. 10 is a block diagram of a telecommunications network architecture for providing a seamless evolution towards an Open Mobile Alliance (OMA) Push-to-talk over Cellular (PoC) solution.

FIG. 10 is a block diagram of a telecommunications network architecture 1000 for providing a seamless evolution towards an Open Mobile Alliance (OMA) Push-to-talk over Cellular (PoC) solution. The telecommunications network architecture 1000 illustrates that the described push-to-talk solution can seamlessly evolve to coexist with the OMA PoC solution and support GSM/GPRS mobile handsets that do not have VoIP capabilities. The network architecture 1000 includes a distributed mobile switching center (MSC) 1005 that supports a push-to-talk service. The distributed MSC 1005 includes a call server 1010 that controls multiple media gateways (MGWs) 1015(1) ... 1015(n), which are connected by interconnections 1020 through which voice bearer traffic can be routed between different media gateways 1015. The interconnections 1020 can use voice over IP (VoIP) and/or asynchronous transfer mode (ATM) for physically connecting the different media gateways 1015. The media gateways 1015 can be geographically distributed over a relatively wide area.

The call server 1010 communicates with the media gateways 1015 using H.248, A-interface signaling 1022. Each media gateway 1015 is associated with one or more base station systems 1025 that include a number of base stations that serve different geographical areas. Each base station provides radio access in one or more cells for communications with GSM mobile stations 1030 and/or GSM/GPRS mobile stations 1030'. Each base station system 1025 exchanges signaling with its corresponding media gateway 1015 using an A-interface 1035 and transmits voice traffic over a TDM channel 1040.

One or more of the media gateways 1015 interface with an SS7 network 1050 that includes a conventional MSC 1045. The MSC 1045 is connected to an SS7 network 1050, through which SS7 signaling can be exchanged with other MSCs (not shown), the call server 1010, and other network entities. For example, the call server 1010 and the MSC 145 can exchange mobile application part NAP) messages through a MAP link 1055 with a home location register (HLR) 1060 through the SS7 network 1050 and can exchange SMS messages with a SMS center (SMSC) 1065.

The call server 1010 communicates with a push-to-talk server 1075 through an IP network 1080, such as the Internet, using SIP messaging. The push-to-talk server 1075 can be accessed using an HTTP access interface to the IP network 1080 to allow users access using HTTP clients 1085. The push-to-talk server 1075 is also connected to a GPRS network 1090 that includes base station systems 1025 that can communicate with mobile stations 1030" that include a UMTS/GPRS SIP client. Signaling relating to GPRS services can be exchanged between the GPRS network 1090 and one or more media gateways 1015 using a Gb interface 1092. In addition, VoIP signals can be routed between a base station system 1025 connected to the GPRS network 1090 and the push-to-talk server 1075 using a VoIP link 1094 through the GPRS network 1090. Furthermore, VoIP signals can also be routed through the IP network 1080 to one or more of the media gateways 1015 using a VoIP link 1096.

The illustrated network architecture 1000 can be used to implement a push-to-talk solution for simultaneously supporting pure GSM mobile devices, GSM/GPRS mobile devices (e.g., in accordance with 3GPP Rev. 99 and Rev. 4), and UMTS/GPRS SIP clients mobile devices (e.g., in accordance with 3GPP Rev. 5 and Rev. 6). For GSM mobile devices, push-to-talk service is provided using a distributed MSC 1005 that supports the push-to-talk media. Accordingly, all "call bridging" and "talk toggling" functions are handled in the call server 1010 and the media gateways 1015 in the manner described in FIGS. 1-9. In this scenario, VoIP and/or ATM interconnections between media gateways 1015 provide long distance savings and can make the push-to-talk service a nationwide or geographically limitless seamless service.

For GSM/GPRS mobile devices, presence and list management access from the mobile device are available through the GPRS network by allowing the mobile station 1030' to access the push-to-talk server 1075 using GPRS. The push-to-talk server 1075 supports the push-to-talk media. Accordingly, all "call bridging" and "talk toggling" functions are handled in the push-to-talk server 1075. Push-to-talk voice services are supported over TDM trunking on the radio access network and VoIP in the core and backbone network (e.g., using the VoIP link 1096 between the push-to-talk server 1075 and the media gateways 1015). This structure allows high quality voice on the radio access network compared to VoIP in the mobile SIP client case. As with GSM mobile devices, VoIP and/or ATM interconnections between multiple media gateways 1015 provide long distance savings and can make the push-to-talk service a nationwide or geographically limitless seamless service. For UMTS/GPRS SIP Client mobile devices, push-to-talk operations may follow the OMA PoC specifications.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers.

A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. Accordingly, other implementations are within the scope of the following claims.

What is claimed is:

1. A method for implementing a push-to-talk feature in a mobile telecommunications environment, the method comprising:
   receiving an indication to activate a push-to-talk service for a first mobile device, the indication received in an unstructured supplementary service data message;
   identifying a group of mobile devices associated with the push-to-talk service for the first mobile device in response to the indication; and
   sending a notification relating to the indication to activate the push-to-talk service for the first mobile device, the notification sent to at least one mobile device other than the first mobile device from the identified group of mobile devices.

2. The method of claim 1 wherein a short message service message is used to send the notification to the at least one mobile device.

3. The method of claim 1 further comprising:
   receiving a call setup request from the first mobile device; and
   establishing a conference bridge including at least two mobile devices from the group of mobile devices in response to the call setup request.

4. The method of claim 3 further comprising:
   receiving a signal from a mobile device connected to the conference bridge; and
   changing a connection status of the mobile device in response to the signal without changing a voice connection status of other mobile devices on the conference bridge.

5. The method of claim 4 wherein the signal comprises a dual tone multi-frequency signal and the connection status is selected from the group consisting of a zero-way connection, a one-way connection, and a two-way connection.

6. The method of claim 1 wherein the push-to-talk service comprises an update to an identification of a mobile device in the group of mobile devices.

7. The method of claim 1 further comprising:
   activating the push-to-talk service in response to the indication; and
   storing an indication of a status of the push-to-talk service.

8. A telecommunications system comprising:
   a mobile switching center operable to activate a push-to-talk service in response to an unstructured supplementary service data message from a first mobile device; and
   a push-to-talk server operable to store data relating to an activated push-to-talk service, the data including identification information for a plurality of mobile devices included in a push-to-talk group, wherein the mobile switching center is operable to establish, in response to a call setup message, a conference bridge for mobile devices in the push-to-talk group using identification information received from the push-to-talk server and to send a notification relating to the activated push-to-talk service to at least one mobile device other than the first mobile device from the push-to-talk group.

9. The telecommunications system of claim 8 wherein the mobile switching center is further operable to establish a context for each of the mobile devices, the conference bridge connecting the contexts.

10. The telecommunications system of claim 8 wherein the push-to-talk server is further operable to update the identification information in response to at least one of an unstructured supplementary service data message from the first mobile device or a message received in a transfer protocol session.

11. The telecommunications system of claim 10 wherein the mobile switching center is operable to initiate a short message service message to at least one mobile device in the group of mobile devices to provide a notification of the updated identification information.

12. The telecommunications system of claim 8 wherein the mobile switching center is operable to initiate a short message service (SMS) message to at least one mobile device in the group of mobile devices using the identification information, the SMS message including the notification of the activated push-to-talk service.

13. The telecommunications system of claim 8 wherein the mobile switching center is further operable to change a connection status for at least one of the mobile devices in the push-to-talk group in response to a dual tone multi-frequency signal.

14. The telecommunications system of claim 8 wherein the mobile switching center comprises a distributed switching center including a call server and a plurality of media gateways, the media gateways operable to handle bearer traffic and the call server operable to control the media gateways and to communicate with the push-to-talk server.

15. The telecommunications system of claim 14 wherein at least one media gateway is further operable to establish the conference bridge under control of the call server.

16. The telecommunications system of claim 8 wherein the mobile switching center is further operable to request routing information for at least one of the mobile devices in the push-to-talk group in response to the call setup message and to establish a connection using identification information received from the push-to-talk server.

17. The telecommunications system of claim 8 wherein the push-to-talk server is further operable to:
   deactivate the push-to-talk service after a predetermined period unless a message is received from the first mobile device; and
   initiate a short message service message to at least one mobile device in the group of mobile devices to provide a notification of the deactivated push-to-talk service.

18. The telecommunications system of claim 8 further comprising a home location register operable to:
   receive the unstructured supplementary service data message from a first mobile device; and
   send a message to the mobile switching center requesting activation of the push-to-talk service.

19. An article comprising a machine-readable medium storing instructions for causing data processing apparatus to:
   activate a push-to-talk service by transmitting an unstructured supplementary service data message from a first mobile device for requesting activation of the push-to-talk service to a node supporting the push-to-talk service, the push-to-talk service associated with at least one group of mobile devices;

send a notification relating to the activated push-to-talk service to at least one mobile device other than the first mobile device from the group of mobile devices; and initiate a call setup request in response to a predetermined user interaction with the first mobile device, the predetermined user interaction associated with establishing a push-to-talk session and the call setup request operable to establish a conference bridge with mobile devices from one of the groups of mobile devices.

20. The article of claim 19 wherein the instructions further cause data processing apparatus to generate a predefined signal for changing a push-to-talk state for the first mobile device in response to a signal indicating a user interaction with a push-to-talk button on the first mobile device.

21. A method for facilitating a push-to-talk feature in a mobile telecommunications environment, the method comprising:

receiving a call setup request in an unstructured supplementary service data message from a first mobile device;

identifying the call setup request as a request for a push-to-talk service;

identifying a group of mobile devices associated with the push-to-talk service;

sending a notification relating to the push-to-talk service to at least one mobile device other than the first mobile device from the group of mobile devices;

establishing a conference bridge including at least two mobile devices from the group of mobile devices in response to the call setup request, the conference bridge connecting a voice connection for each of the at least two mobile devices and each voice connection having an associated status; and changing the voice connection from one status to another status during the call without interfering with the voice connection status of other mobile devices connected to the conference bridge.

* * * * *